US012807106B2

(12) United States Patent
Mazzoni et al.

(10) Patent No.: US 12,807,106 B2
(45) Date of Patent: Nov. 24, 2026

(54) METHOD FOR CONTROLLING THE DISTRIBUTION OF BRAKING FORCES IN A BRAKING SYSTEM OF A VEHICLE TO REDUCE OR ELIMINATE NOISE AND/OR VIBRATIONS

(71) Applicant: Brembo S.p.A., Curno (IT)

(72) Inventors: Matteo Mazzoni, Curno (IT); Andrea Cerutti, Curno (IT); Beniamin Szewczyk, Curno (IT); Cristian Malmassari, Curno (IT)

(73) Assignee: Brembo S.p.A., Curno (IT)

( * ) Notice: Subject to any disclaimer, the term of this patent is extended or adjusted under 35 U.S.C. 154(b) by 56 days.

(21) Appl. No.: 18/695,905

(22) PCT Filed: Sep. 27, 2022

(86) PCT No.: PCT/IB2022/059182
§ 371 (c)(1),
(2) Date: Mar. 27, 2024

(87) PCT Pub. No.: WO2023/052994
PCT Pub. Date: Apr. 6, 2023

(65) Prior Publication Data

US 2024/0400013 A1 Dec. 5, 2024

(30) Foreign Application Priority Data

Sep. 30, 2021 (IT) ........................ 102021000025142

(51) Int. Cl.

| | |
|---|---|
| ***B60T 8/173*** | (2006.01) |
| ***B60T 8/171*** | (2006.01) |
| ***B60T 8/172*** | (2006.01) |

(52) U.S. Cl.
CPC .............. *B60T 8/173* (2013.01); *B60T 8/171* (2013.01); *B60T 8/172* (2013.01); *B60T 2220/04* (2013.01)

(58) Field of Classification Search
CPC .......... B60T 8/173; B60T 8/171; B60T 8/172; B60T 2220/04; B60T 17/22;
(Continued)

(56) References Cited

U.S. PATENT DOCUMENTS

| | | | |
|---|---|---|---|
| 6,988,595 | B2 | 1/2006 | Kamiya et al. |
| 10,661,772 | B2 | 5/2020 | Yasui |

FOREIGN PATENT DOCUMENTS

| | | | | |
|---|---|---|---|---|
| JP | 2004284398 A | * 10/2004 | ................ B60T 8/00 |
| JP | 2004286141 A | * 10/2004 | ............. G01N 29/46 |
| WO | 0226539 A2 | 4/2002 | |

OTHER PUBLICATIONS

European Patent Office, International Search Report and Written Opinion in Application No. PCT/IB2022/059182, dated Jan. 23, 2023, 7 pages. Rijswijk, Netherlands.

* cited by examiner

*Primary Examiner* — Hai H Huynh
(74) *Attorney, Agent, or Firm* — Marshall & Melhorn, LLC

(57) ABSTRACT

The invention relates to a method for controlling a braking system of a vehicle for distributing braking forces on at least one piston of a disc brake caliper of the vehicle. The method is performed by a braking system control system. The method comprises the steps of:

receiving, by the control system, a request for applying a braking force following a braking action applied on a pedal/button of the braking system;

applying the required braking force to the at least one piston;

(Continued)

detecting a current characteristic frequency information of the braking system by means of at least one sensor operationally associated with the braking system, this characteristic frequency is representative of current noises and/or vibrations associated with the braking system;

comparing this detected current characteristic frequency information with a reference characteristic frequency representative of a critical operating condition of the braking system;

if the detected current characteristic frequency information of the braking system is equal to the reference characteristic frequency, the method further comprises the step of:

applying to the at least one piston of a disc brake caliper of the vehicle an additional braking force generated by superimposing a force signal having a time-variable amplitude on said requested braking force.

9 Claims, 6 Drawing Sheets

(58) Field of Classification Search

CPC .. B60T 13/745; B60T 13/741; F16D 65/0006; F16D 65/0012; F16D 2066/005; B60Y 2306/09; B60Y 2400/81

USPC .......................................... 701/70, 76, 78, 83

See application file for complete search history.

METHOD FOR CONTROLLING THE DISTRIBUTION OF BRAKING FORCES IN A BRAKING SYSTEM OF A VEHICLE TO REDUCE OR ELIMINATE NOISE AND/OR VIBRATIONS

FIELD

The present invention relates to the field of braking systems of a vehicle operating with Brake-by-Wire (BBW) technology. In greater detail, the present invention relates to a method for controlling the distribution of braking forces in a vehicle braking system that comprises at least one disc brake associated with a vehicle wheel to either reduce or eliminate noise and/or vibrations generated in the system.

BACKGROUND

As known, the braking systems mainly serve two purposes: service braking and parking braking.

A braking system of a vehicle, in particular a motor vehicle, operating in Brake-by-Wire (BBW) technology comprises a plurality of disc brakes each associated with one wheel of the motor vehicle. Each disc brake comprises a respective electro-actuated brake caliper configured to clamp onto the disc, locking it in the case of service or parking braking. The braking system involves the use of an electronic control unit (ECU) and electromechanical actuators controlled by this electronic control unit to act on the electric motors of the brake calipers by enabling/disabling the caliper clamping.

In the automotive field, a representative parameter for measuring the comfort of a motor vehicle is indicated by the acronym (Noise, Vibration, and Harshness). This parameter provides guidance concerning the perceived noise and vibration characteristics associated with motor vehicles. In particular, the braking system of a motor vehicle is directly involved in the generation of vehicle noise and vibration.

Nowadays, for reducing the noise and vibrations associated with a braking system of a motor vehicle, it is known to perform a step of testing on a prototype of the braking system during the development of the design. This makes it possible to optimize the test system before starting the production.

However, solving issues related to noise and vibration reduction in the test braking system involves a long development time and a significant amount of resources, as it may require numerous cycles of refinement.

In other words, in practice, this step of testing for optimizing a braking system often appears to be either too costly or excessively time-consuming to complete.

Therefore, the need is still strongly felt for reducing or eliminating noise and/or vibrations generated in a vehicle braking system, in particular a motor vehicle, allowing it to overcome the limitations and drawbacks of the known methods mentioned above.

SUMMARY

It is an object of the present invention to devise and make available a method for controlling the distribution of braking forces in a braking system of a vehicle which comprises at least one disc brake associated with a vehicle wheel to either reduce or eliminate noise and/or vibrations generated in the system.

This need is achieved by a method for controlling a braking system of a vehicle according to the claims described herein.

The control method of the invention comprises an algorithm which implements an active control of the vehicle braking system. This algorithm is configured to be activated only upon the detection, e.g., by means of a microphone or accelerometer, of current operating frequency information of the braking system, which is equal to a threshold value or critical frequency placed within a range or band of critical frequencies of predetermined amplitude. For example, this range of critical frequencies comprises all frequencies around a reference or center-band critical frequency value, e.g., critical frequencies that in absolute value differ by more than 5%, in particular by more than 3%, from the reference critical frequency.

It is a further object of the present invention a braking system control system of a vehicle for distributing braking forces according to the claims described herein.

Some advantageous embodiments are the object of the dependent claims.

DESCRIPTION OF THE FIGURES

Further features and advantages of the control method according to the invention will become apparent from the description provided below of preferred exemplary embodiments thereof, given by way of non-limiting example, with reference to the accompanying drawings, in which.

Similar or equivalent elements in the aforesaid figures are indicated with the same reference numerals.

DETAILED DESCRIPTION

Figure 1:
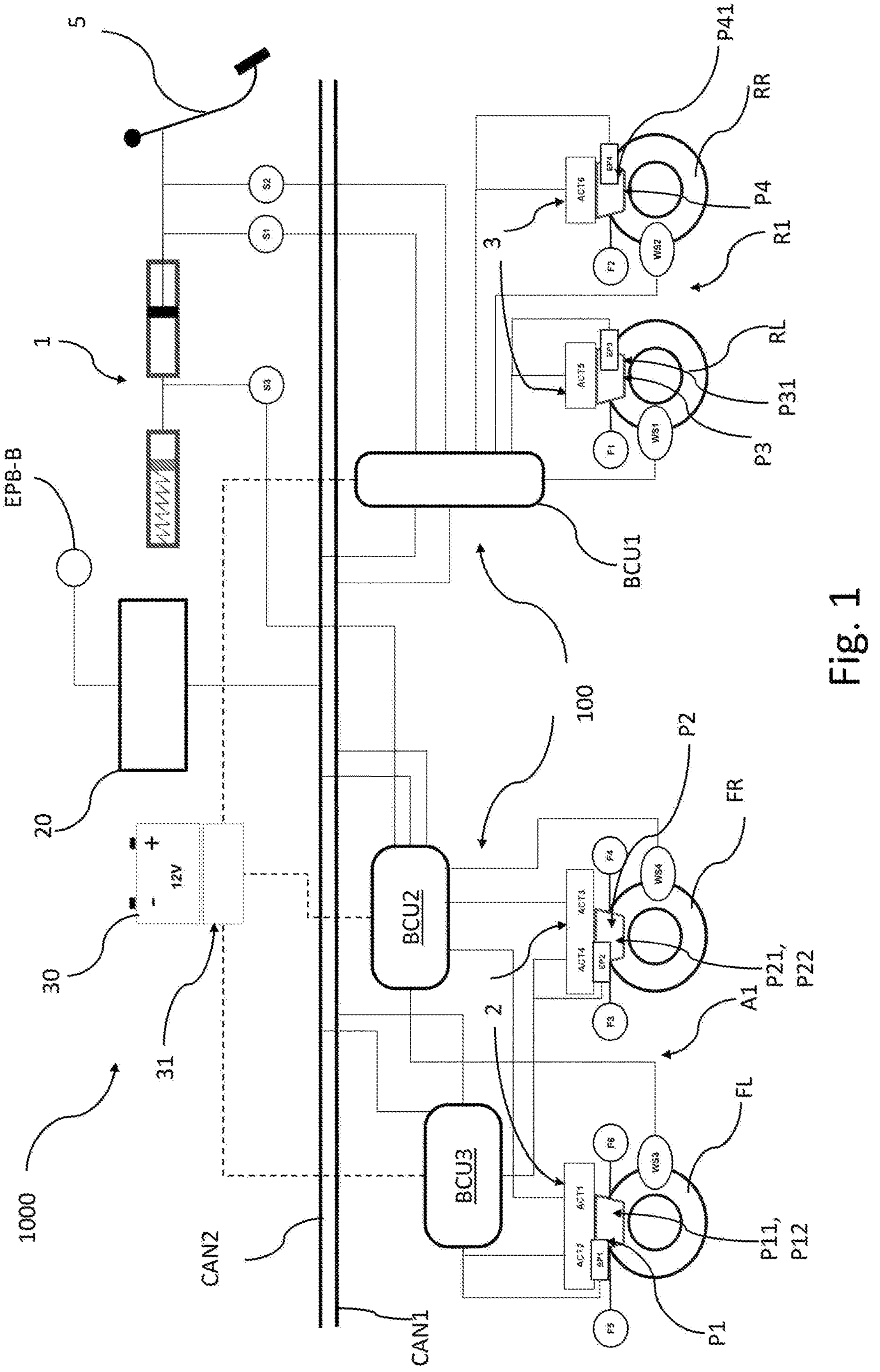
FIG. 1 diagrammatically shows an example of vehicle braking system architecture employing a system for controlling the distribution of braking forces for the service braking or the parking braking of the vehicle which implements the method according to the present invention.

With reference to FIG. 1, the reference numeral 1000 indicates as a whole a braking system of a vehicle 1 comprising a control system 100 of a braking system for distributing braking forces for service braking and/or parking braking of the vehicle 1 according to the present invention. Hereafter, this control system 100 of braking system is also referred simply as control system or system.

For example, the braking system 1000, in which the control system 100 can be used, is an architecture with Brake-by-Wire (BBW) technology.

For the purposes of the present description, "vehicle" means any vehicle or motorcycle, also of commercial type, having two, three, four, or more wheels.

Furthermore, "braking system" means the whole of all the components (mechanical and/or electric or electronic, also the brake fluid) which contribute to generating the service braking of a vehicle or to generating the parking braking of a vehicle.

Referring to FIG. 1, the vehicle 1 comprises a front axle A1 to which a first front wheel FL and a second front wheel FR are connected.

For example, the first front wheel FL is the left front wheel and the second front wheel FR is the right front wheel.

Furthermore, the vehicle 1 comprises a rear axle R1 to which a first rear wheel RL and a second rear wheel RR are connected.

For example, the first rear wheel RL is the left rear wheel while the second rear wheel RR is the right rear wheel.

The braking system 1000 comprises at least one first actuator module 2 operatively connected to the first front axle A1.

The braking system 1000 further comprises at least one second actuator module 3 operatively connected to the rear axle R1.

Each actuator module 2, 3 comprises one or more actuators for each wheel per axle.

Each actuator is either an electro-mechanical type or an electro-hydraulic type.

With reference to the embodiment shown in FIG. 1, the at least one first actuator module 2 operatively connected to the front axle A1 comprises a first actuator ACT1 and a second actuator ACT2 configured to act on a first brake caliper P1, in particular a two-piston caliper, of the first front wheel FL.

In more detail, this first P1 brake caliper comprises a first piston P11 and a second piston P12 actuated by the first actuator ACT1 and the second actuator ACT2, respectively.

Furthermore, the at least one first actuator module 2 comprises a third actuator ACT3 and a fourth actuator ACT4 configured to act on a second brake caliper P2, in particular a two-piston caliper, of the second front wheel FR.

In greater detail, this first brake caliper P2 comprises a respective first piston P21 and a respective second piston P22 actuated by the third actuator ACT3 and the fourth actuator ACT4, respectively.

With reference again to the embodiment shown in FIG. 1, the at least one second actuator module 3 operatively connected to the rear axle R1 comprises a fifth actuator ACT5 configured to act on a third brake caliper P3 of the first rear wheel RL. This third brake caliper is, in particular, a single-piston caliper.

In greater detail, this third brake caliper P3 comprises a respective first piston P31 actuated by the fifth actuator ACT5.

Furthermore, the at least one second actuator module 3 comprises a sixth actuator ACT6 configured to act on a fourth brake caliper P4 of the second rear wheel RR. In particular, this fourth brake caliper is a single-piston caliper.

In greater detail, this fourth brake caliper P4 comprises a respective first piston P41 actuated by the sixth actuator ACT6.

It is worth noting that the architecture of the braking system 1000 described above, comprising calipers with two pistons acting on the wheels of the front axle A1 and single-piston calipers acting on the wheels of the rear axle R1, is an example. Indeed, for the purposes of the present invention, a plurality of variants and combinations of variants may be provided, such as, for example: calipers with a number of pistons greater than two on both front axle wheels and rear axle wheels; calipers with two pistons also on rear axle wheels; single-piston calipers on both front axle wheels and rear axle wheels; etc. It is further worth noting that for the purposes of the present invention, the aforesaid brake calipers P1, P2, P3, P4 may be either "dry" or "wet" type calipers.

Each actuator ACT1, ACT2, ACT3, ACT4, ACT5, ACT6 is adapted to implement a braking command based on control received from a respective electronic actuator control module or electronic brake control unit or BCU. Each actuator control module is, e.g. a hardware module or software logic module within a hardware module of the braking system (standalone or integrated into the actuator itself) or of the vehicle 1 more in general.

With reference to the example in FIG. 1, the electronic brake control units BCU1, BCU2, BCU3 contribute to forming the control system 100 of the braking system 1000 of the vehicle 1.

In particular, each of the aforesaid electronic brake control units BCU1, BCU2, BCU3 comprises, for example, a microcontroller or microprocessor, and is configured to generate electrical signals for the actuation of the electro-actuated brake calipers P1, P3, P3, P4 of the system 1000.

In particular, the control system 100 of the braking system 1000 comprises a first brake control unit BCU1 operatively connected to the second actuator module 3.

This first brake control unit BCU1 or main control unit is configured to directly control the second actuator module 3 to perform service braking on the wheels of the rear axle R1 of the vehicle 1 in response to a braking action applied on a pedal 5 of the braking system 1000.

This first brake control unit BCU1 is configured to control, through a secondary brake control unit BCU2, BCU3, the first actuator module 2 to perform service braking on the wheels of the front axle A1 of vehicle 1 in response to the braking action applied on the pedal 5 of the braking system 1000.

In particular, the first brake control unit BCU1 is configured to calculate target braking torque values to be applied to both rear axle wheels R1 and front axle wheels A1 of vehicle 1 based on braking signals S1, S2 generated as a result of the action on the pedal 5 of the system 1000. This first brake control unit BCU1 is called, for example, "master control unit".

The target braking torque values are made available to the secondary brake control unit BCU2, BCU3 through a bidirectional data communications line or bus CAN1, e.g., of the serial type, connecting the first brake control unit BCU1 to the secondary brake control unit BCU2, BCU3.

With reference to the example in FIG. 1, this secondary brake control unit BCU2, BCU3 comprises a second brake control unit BCU2 and a third brake control unit BCU3, each connected to the first brake control unit BCU1 through the data communications line CAN1.

In an embodiment, the second brake control unit BCU2 is configured to receive the target braking torque values generated by the first brake control unit BCU1 to apply them to each wheel of front axle A1. In this operational configuration, the second brake control unit BCU2 operates as a "slave control unit".

In particular, with reference to the example in FIG. 1, the second brake control unit BCU2 is configured to control both the third actuator ACT3 of the second front wheel FR and the first actuator of the first front wheel FL.

In a different embodiment, the second brake control unit BCU2 is configured to generate, in the background, target braking torque values independently from the first brake control unit BCU1 to apply them to each wheel of the front axle A1. In particular, the target braking torque values are generated based on a further braking signal S3 generated as a result of the action on the pedal 5 of the system 1000. In this operational configuration, the second brake control unit BCU2 allows the braking of the wheels of front axle A1 to be managed even if the first brake control unit BCU1 fails, operating as a "quasi-master control unit".

In an embodiment, the third brake control unit BCU3 is configured to receive the target braking torque values generated by the first brake control unit BCU1 to apply them to each wheel of front axle A1. In this operational configuration, this third brake control unit BCU3 operates as a "slave control unit". Unlike the "quasi-master control unit," the third brake control unit BCU3 is not tasked with generating target braking torque values.

In particular, the third brake control unit BCU3 is configured to control both the second actuator ACT2 of the first front wheel FL and the fourth actuator of the second front wheel FR.

Based on the control of the actuators ACT1, ACT2, ACT3, ACT4 achieved through the second brake control unit BCU2 and the third brake control unit BCU3, in case of malfunction of one of the control units, the system 100 of the invention still ensures balanced braking on both wheels of the front axle A1 of the vehicle 1.

In an embodiment, the first BCU1, the second BCU2, and the third BCU3 braking electronic control units are powered through the DC voltage of a battery 30 of the vehicle 1 through a respective power manager block 31 of the braking system 1000.

Furthermore, the braking system 1000 comprises wheel speed sensors WS1, WS2, WS3, WS4 each operationally associated with one of the wheels of the vehicle 1, respectively with the first RL and the second RR rear wheels, and with the first FL and second FR front wheels to detect a speed of each wheel to be transmitted to a respective brake control unit.

In particular, the first WS1 and the second WS2 speed sensors are connected to the first brake control unit BCU1. The third WS3 and the fourth WS4 speed sensors are connected to the second brake control unit BCU2.

With reference to the example in FIG. 1, the at least one first actuator module 2 of the braking system 1000 comprises a first EP1 and a second EP2 parking actuators configured to act on the first P1 and the second P2 brake calipers of the front axle A1, respectively, when the parking brake is activated.

With reference again to the embodiment shown in FIG. 1, the at least one second actuator module 3 comprises a third EP3 and a fourth EP4 parking actuators configured to act on the third P3 and fourth P4 brake calipers of the rear axle R1, respectively, when the parking brake is activated.

The first EP1 and the second EP2 parking actuators are controlled by the third brake control unit BCU3. The third EP3 and the fourth EP4 parking actuators are controlled by the first brake control unit BCU1.

In particular, a parking command is activated by a parking control unit 20 of the vehicle 1 following the pressure applied on a parking button EPB-B by the user. This parking control unit 20 is configured to transmit the aforesaid parking command to the first BCU1, the second BCU2, and the third BCU3 brake control unit of the system through a further bidirectional data communication line or bus CAN2, e.g., of the serial type, connecting parking control unit 20 to each of the brake control units BCU1, BCU2, BCU3.

Figure 2:
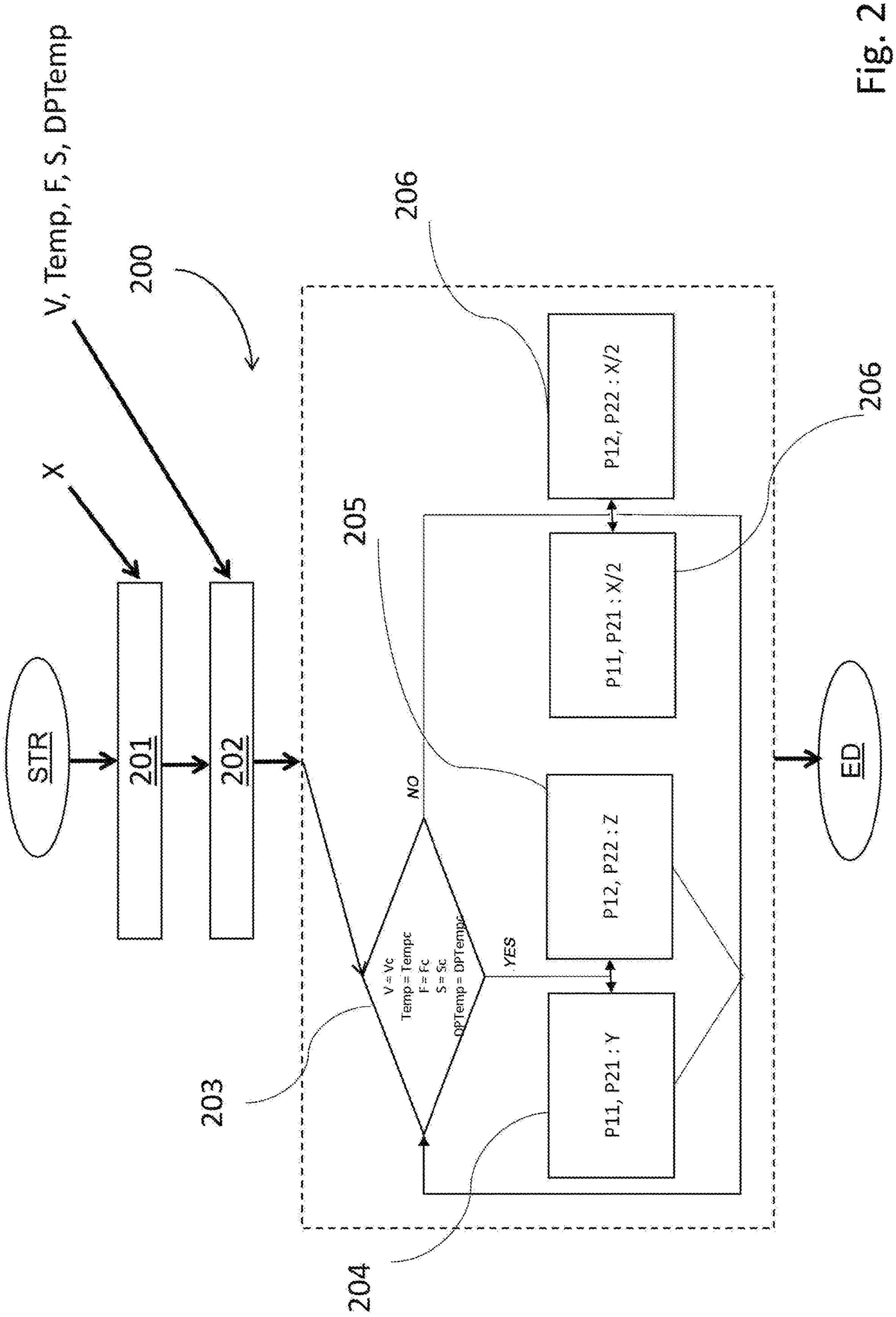
FIG. 2 shows, in a flowchart, an embodiment of the method for controlling the distribution of braking forces in the braking system of FIG. 1.
Figure 3:
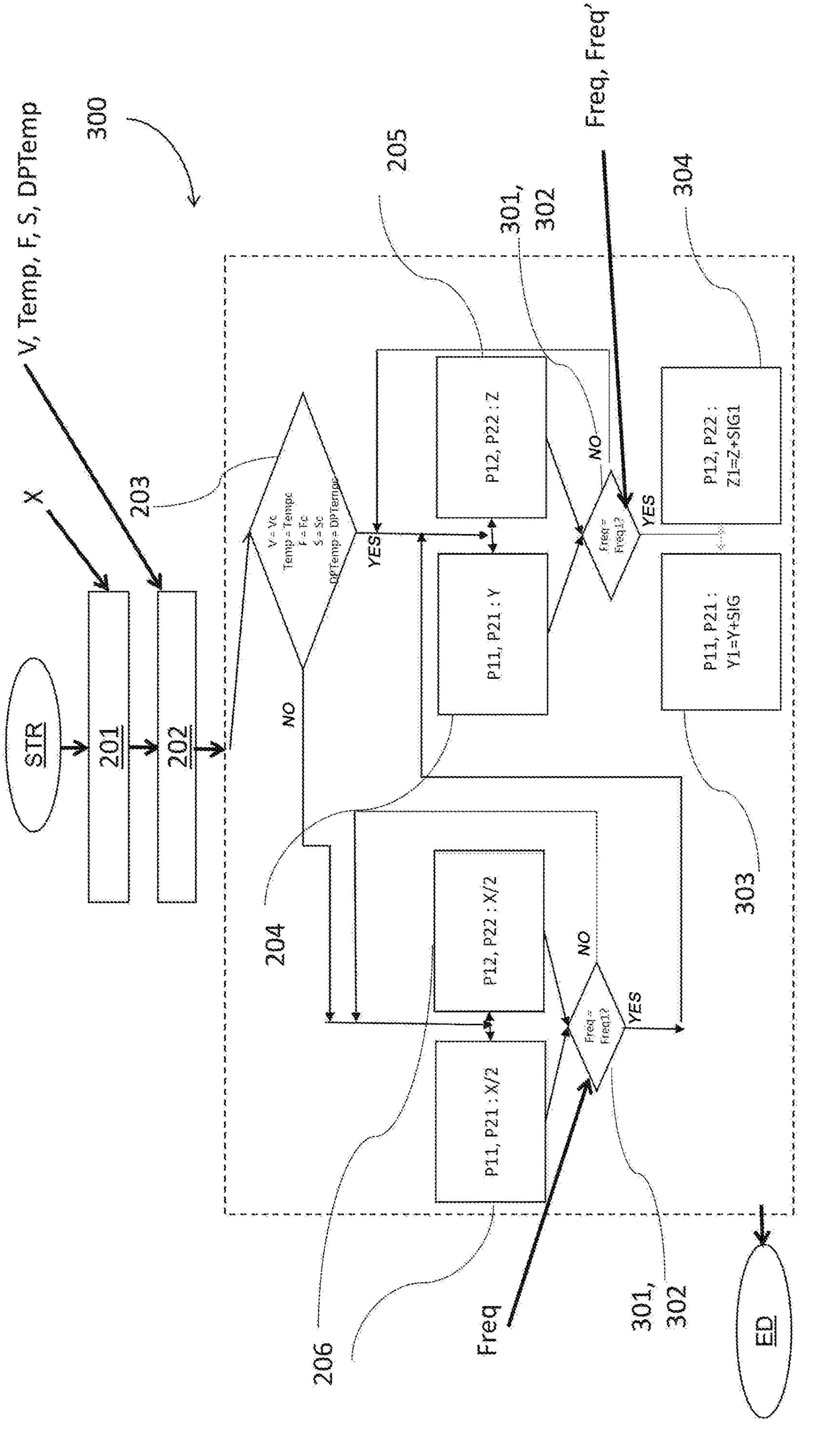
FIG. 3 shows, in a flowchart, a further embodiment of the method for controlling the distribution of braking forces in the braking system in FIG. 1.
Figure 4:
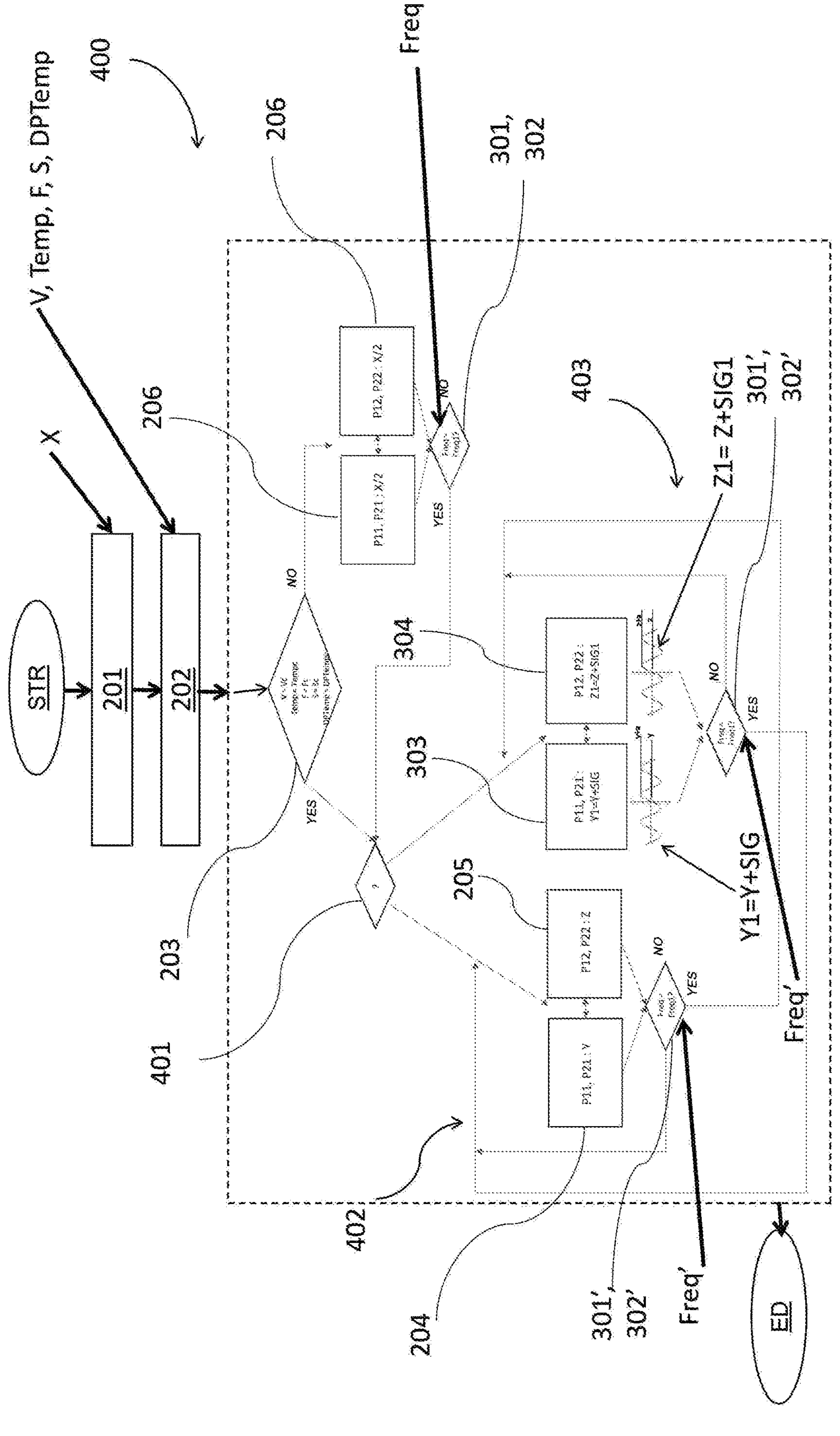
FIG. 4 shows, in a flowchart, a further embodiment of the method for controlling the distribution of braking forces in the braking system in FIG. 1.

With reference to FIGS. 2-4, the following describes in more detail the operational steps of a method 200, 300, 400 for controlling the distribution of the braking forces F3, F4, F5, F6 in a braking system 1000 of a vehicle 1, on at least one first piston P11, P21 and at least one second piston P12, P22 of a disc brake caliper P1, P2 of vehicle 1. This control method is implemented through the control system 100 described above.

In particular, this control method comprises a first algorithm, which implements a passive control of the braking system 1000 of the vehicle 1. This first algorithm is configured to activate whenever the braking system is in predetermined critical conditions.

By way of example, reference will be made hereafter to the first piston P11, P21, and the second piston P12, P22 of the disc brake calipers P1, P2 of the front axle A1 of the vehicle 1.

In a general embodiment, each of the aforesaid first BCU1, second BCU2, and third BCU3 brake control units of the system 100 are set up to execute codes of an application program implementing the method 200, 300, 400.

For example, with reference to the example in FIG. 1, the following will assume that the control method 200, 300, 400 is implemented by the second BCU2 and/or the third BCU3 brake control unit of the system 100.

In a particular embodiment, the processor of the control braking unit is configured to load, in a respective memory block, and execute the application program codes implementing the method 200, 300, 400.

The control method 200, 300, 400 in FIGS. 2-4 starts with a symbolic step of start "STR" and ends with a symbolic step of end "ED".

In the most general embodiment, the control method 200, 300, 400 of a braking system 1000 comprises a step of receiving 201, by the control system 100, a request to apply a braking force X following a braking action applied on a pedal 5 (or on a button EPB-B) of the braking system 1000, e.g., by a user.

Furthermore, the method 200, 300, 400 comprises a step of receiving 202, by the control system 100, a first plurality of parameters V, Temp, F, S, DPTemp associated with the braking system 1000 each representative of a current operating condition of the braking system.

This first plurality of parameters preferably comprises, but is not limited to, information about the current speed V of vehicle 1, the current temperature Temp of the external environment, the current actuating force/pressure F, the current slope S of the wheel sliding plane, the current temperature of the disc pad or the current temperature of the disc itself DPTemp.

This first plurality of parameters V, Temp, F, S, DPTemp can be obtained from the control system 100 through appropriate sensors or "estimating" devices which equip the BBW braking system 1000 of the vehicle 1, e.g., such as the aforesaid speed sensors WS1, WS2, WS3, WS4 or sensors (HW) which equip the braking system or the vehicle, or estimators (SW), sensors of ambient temperature, road slope, braking system pressure, etc.

Furthermore, a step of comparing 203, by the control system 100, each received parameter V, Temp, F, S, DPTemp of said first plurality of parameters with a respective reference parameter Vc, Tempc, Fc, Sc, DPTempc of a second plurality of parameters representative of a critical operating condition of the braking system 1000, is provided.

This second plurality of parameters preferably comprises, but is not limited to, information about the critical speed Vc of the vehicle 1, the critical temperature Tempc of the external environment, the critical actuating force/pressure Fc, the critical slope Sc of the wheel sliding plane, the critical temperature DPTempc of the disc pad or the critical temperature of the disc itself. It is worth noting that each critical benchmark parameter Vc, Tempc, Fc, Sc, DPTempc of the braking system 1000 can assume either a single critical parameter value or, preferably, it can take a plurality of values from a range of values representative of the same critical parameter, e.g., different values of "critical" pressures or speeds and even different combinations of parameters with each other. Indeed, a specific braking system noise or disturbance frequency 1000 is associated with a plurality of estimated and measured critical parameter values relative to the specific operating conditions. For example, a noise frequency of 2 kHz is characterized by speed between 5-15 km/h, pressure between 10-20 bar, and temperature comprised between −5° C. and 0° C. Other noises having different frequencies will be associated with a respective plurality of estimated and measured critical parameter values specific to this frequency and different from the aforesaid values related to the 2 kHz noise frequency.

This second plurality of parameters Vc, Tempc, Fc, Sc, DPTempc (either single values or sets of values) is, for example, stored in a CAN database of the vehicle 1.

If at least one of the parameters V, Temp, F, S, DPTemp of the first plurality of parameters equals the respective reference parameter Vc, Tempc, Fc, Sc, DPTempc of the second plurality of parameters, the method 200, 300, 400 comprises the steps of:

- applying 204 a first braking force Y to the first piston P11, P21 of the disc brake caliper P1, P2 of the vehicle 1,
- applying 205 a second braking force Z to the second piston P12, P22 of the disc brake caliper P1, P2 of the vehicle 1.

In particular, a sum of the aforesaid first braking force Y and second braking force Z is equal to the requested braking force X and a ratio between the first braking force Y and the second braking force Z is different from one.

If each of the parameters V, Temp, F, S, DPTemp of the first plurality of parameters differs from the respective reference parameter Vc, Tempc, Fc, Sc, DPTempc of the second plurality of parameters, i.e., the braking system is out of the critical operating range, the method 200, 300, 400 comprises the step of applying 206 a third braking force X/2 equal to half the required braking force X to both the first piston P11, P21 and the second piston P12, P22 of the disc brake caliper P1, P2 of the vehicle 1.

In an alternative embodiment, if each of the parameters V, Temp, F, S, DPTemp of the first plurality of parameters differs from the respective reference parameter Vc, Tempc, Fc, Sc, DPTempc of the second plurality of parameters, i.e., the braking system is out of the critical operating range, the method 200, 300, 400 comprises the step of applying a further first and a further second braking force to the first piston P11, P21 and to the second piston P12, P22 of the disc brake caliper P1, P2 of the vehicle 1, respectively, in which a ratio between said further first and further second force and braking force is predetermined and different from one and a sum between said further first and further second braking force is equal to the required braking force X.

It is worth noting that the relationship between the first Y and the second Z braking forces is characterized during the development of the caliper P1, P2 to avoid instability (noise) and is as a function of the instability of the caliper, but also of the level of clamping force, temperature and vehicle speed at which this instability is triggered.

In an embodiment, the ratio between the first braking force Y and the second braking force Z is chosen to be greater than one.

During experimental tests conducted on the test vehicles, the Applicant observed that the caliper P1, P2 shows instability at 5 kHz, at 0° C., at speed V<15 km/h, and for force values F comprised between 5 and 10 kN. Furthermore, the Applicant has experimentally verified that, under these operating conditions, the aforesaid instability disappears if the first Y and second Z braking force are calculated by means of the equations:

$$\text{first braking force } Y = 0.8 * \text{requested braking force } X,$$

$$\text{second braking force } Z = 0.2 * \text{requested braking force } X.$$

With reference to FIG. 3, in a further embodiment, when at least one of the parameters V, Temp, F, S, DPTemp of the first plurality of parameters equals the respective reference parameter Vc, Tempc, Fc, Sc, DPTempc of the second plurality of parameters, the method 300 comprises, after the aforementioned steps of applying 204, 205, the step of detecting 301, by the control system 100, an information of current characteristic frequency Freq of the braking system 1000 by means of at least one sensor operatively associated with the system. This characteristic frequency Freq is representative of current noise and/or vibration associated with the braking system 1000.

In an example of embodiment, the at least one sensor operatively associated with the braking system 1000 comprises:

- at least one microphone operationally associated with the braking system, or
- a plurality of accelerometers, each associated with a disc brake caliper P1, P2 of the vehicle 1.

In an embodiment, the aforesaid microphone associated with the braking system can be, in the most general case, a microphone already installed in the car (either inside or outside the passenger compartment), e.g., such as an internal hands-free microphone.

The method 300 further provides a step of comparing 302, by the control system 100, this detected current characteristic frequency Freq information with a reference characteristic frequency or critical frequency Freq1 representative of a critical operating condition of the braking system 1000.

Preferably, the aforementioned critical frequency Freq1 comprises a range or band of critical frequencies having predetermined amplitude. For example, this range of critical frequencies comprises all the frequencies around a reference or center-band critical frequency value, e.g., the frequencies which in absolute value differ by more than 5%, in particular by more than 3%, from the reference critical frequency. Therefore, the term characteristic reference frequency or critical frequency Freq1 is used hereafter to indicate both the value of the aforesaid reference critical frequency and all values of frequencies in the aforesaid frequency band which differ from the reference critical frequency with tolerances at more than 5%, in particular at more than 3%.

The critical frequency Freq1 is measured during the step of developing the braking system and is related to noise and vibration detection. The critical frequency reference values are characterized during the step of product development before technical approval or production startup on roller stand benches or prototype vehicles.

If the detected current characteristic frequency information Freq of the braking system 1000 is equal to the reference characteristic frequency Freq1, i.e., current characteristic frequency Freq is a frequency in the band of the aforesaid critical frequencies, defined around the value of the reference characteristic frequency, method the 300 further comprises the steps of:

- applying 303 to the first piston P11, P21 of the disc brake caliper P1, P2 of the vehicle 1 a fourth braking force Y1 generated by superimposing a force signal SIG, SIG1 having a time-variable amplitude "a" on the first braking force Y,
- applying 304 to the at least one second piston P12, P22 of the disc brake caliper P1, P2 of the vehicle 1 a fifth braking force Z1 generated by superimposing this force signal SIG, SIG1 having time-variable amplitude a on the second braking force Z.

In particular, a sum of the fourth braking force Y1 and fifth braking force Z1 is equal to the requested braking force X.

With reference again to FIG. 3, in a further embodiment, when at least one of the parameters V, Temp, F, S, DPTemp of the first plurality of parameters differs from the respective reference parameter Vc, Tempc, Fc, Sc, DPTempc of the second plurality of parameters, the method 300 comprises, after the aforesaid step of applying 206, the steps of detecting 301, by the control system 100, current characteristic frequency information Freq of the braking system 1000 by means of at least one sensor operatively associated with the system. This characteristic frequency Freq is representative of current noise and/or vibration associated with the braking system 1000.

Furthermore, the method 300 provides a step of comparing 302, by the control system 100, this detected current characteristic frequency Freq information with a reference characteristic frequency Freq1 representative of a critical operating condition of the braking system 1000.

If the detected current characteristic frequency information Freq of the braking system 1000 is equal to the reference characteristic frequency Freq1, i.e., the current characteristic frequency Freq is in the band of the critical frequencies, defined around the value of the reference characteristic frequency, the method 300 further comprises the steps of:

- applying 204 the first braking force Y to the first piston P11, P21 of the disc brake caliper P1, P2 of the vehicle 1,
- applying 205 the second braking force Z to the at least one second piston P12, P22 of the disc brake caliper P1, P2 of the vehicle 1.

In particular, the sum of the aforesaid first braking force Y and second braking force Z is equal to the requested braking force X and a ratio between the first braking force Y and the second braking force Z is different from one.

Similarly as described above, the method 300 further comprises the steps of detecting 301, by the control system 100, further current characteristic frequency information Freq' of the braking system 1000 by means of the at least one sensor operationally associated with the system and of comparing 302, by the control system 100, the detected current further characteristic frequency information Freq' with the reference characteristic frequency Freq1 of the braking system.

If this further detected current characteristic frequency information Freq' of the braking system is equal to the reference characteristic frequency Freq1, the method 300 further comprises the steps of:

- applying 303 the fourth braking force Y1 to the at least one first piston P11, P21 of the disc brake caliper P1, P2 of the vehicle 1,
- applying 304 the fifth braking force Z1 to the at least one second piston P12, P22 of the disc brake caliper P1, P2 of the vehicle 1.

In an embodiment, the aforesaid force signal SIG, SIG1 having time variable amplitude "a" comprises a signal which assumes amplitude values either greater or lesser than a mean value.

In a particular embodiment, the force signal SIG, SIG1 having time-varying amplitude a is chosen from the group consisting of sine signal, ramp signal, triangle signal, square wave signal, randomly varying signal around a mean value.

In a yet further particular embodiment, the force signal SIG, SIG1 having time variable amplitude a comprises a first force signal SIG and a second force signal SIG1 in mutual phase opposition. This first force signal SIG is superimposable on the first braking force Y to generate the fourth braking force Y1, the second force signal SIG1 is superimposable on the second braking force Z to generate the fifth braking force Z1.

In an embodiment, the frequency of the first SIG and the second SIG1 superimposable force signal is at least in the range of 1-200 Hz.

With reference to FIG. 4, in a further embodiment, if each of the parameters V, Temp, F, S, DPTemp of the first plurality of parameters differs from the reference parameter Vc, Tempc, Fc, Sc, DPTempc of the second plurality of parameters, the method 400 comprises, after the aforesaid steps of applying 206, the steps of:

- detecting 301, by the control system 100, a further current characteristic frequency Freq information of the braking system 1000 by means of the at least one sensor operatively associated with the system,
- comparing 302, by the control system 100, this detected current characteristic frequency Freq information with a reference characteristic frequency Freq1 representative of a critical operating condition of the braking system 1000.

If said detected current characteristic frequency Freq information of the braking system 1000 is equal to the reference characteristic frequency Freq1, the method 400 comprises a step of randomly selecting 401 a first 402 or a second 403 distribution method of the braking forces F3, F4, F5, F6 on the first P11, P21 and second P12, P22 piston of a caliper P1, P2 of a vehicle disc brake 1.

In greater detail, the first distribution method 402 of braking forces F3, F4, F5, F6 comprises the steps of:

- applying 204 a first braking force Y to the first piston P11, P21 of the disc brake caliper P1, P2 of the vehicle 1,
- applying 205 a second braking force Z to the second piston P12, P22 of the disc brake caliper P1, P2,
- wherein the sum of said first Y and second Z braking forces is equal to the requested braking force X and a ratio between said first Y and second Z braking forces is different from one.

Furthermore, the method 400 provides:

- a step of detecting 301', by the control system 100, further current characteristic frequency information Freq' of the braking system 1000 by means of the at least one sensor operatively associated with the system;
- a step of comparing 302', by the control system 100, said further detected current characteristic frequency information Freq' with a reference characteristic frequency Freq1 of the braking system.

If this further detected current characteristic frequency information Freq' of the braking system 1000 is equal to the reference characteristic frequency Freq1, the method 400 further comprises the steps of:

applying 303 to the first piston P11, P21 of the disc brake caliper P1, P2 of the vehicle a fourth braking force Y1 generated by superimposing a force signal SIG having a time-variable amplitude a on the first braking force Y, applying 304 to the second piston P12, P22 of the disc brake caliper P1, P2 of the vehicle a fifth braking force Z1 generated by superimposing said force signal SIG1 having a time-variable amplitude a on the second braking force Z, wherein the sum of said fourth Y1 and fifth Z1 braking force is equal to the requested braking force X.

With reference again to FIG. 4, in a further embodiment, the aforesaid second distribution method 403 for the braking forces F3, F4, F5, F6 comprises the steps of:

making available a first braking force Y and a second braking force Z, wherein the sum of said first Y and second Z braking force is equal to the requested braking force X and a ratio between the first Y and second Z braking forces is different from one, applying 303 to the at least one first piston P11, P21 of a disc brake caliper P1, P2 of the vehicle a fourth braking force Y1 generated by superimposing a force signal SIG having a time-variable amplitude a on the first braking force Y, applying 304 to the at least one second piston P12, P22 of the disc brake caliper P1, P2 of the vehicle 1 a fifth braking force Z1 generated by superimposing the aforesaid force signal SIG1 having a time-variable amplitude a on the second braking force Z.

In particular, the sum of the fourth Y1 and fifth Z1 braking forces is equal to the requested braking force X.

The method 400 further comprises a step of detecting 301', by the control system 100, a further current characteristic frequency information Freq' of the braking system 1000 by means of the at least one sensor operatively associated with the system, and a step of comparing 302', by the control system 100, the further detected current characteristic frequency information Freq' with the reference characteristic frequency Freq1 of the braking system.

If this further detected current characteristic frequency information Freq' is equal to the reference characteristic frequency Freq1, the method 400 further comprises the steps of:

applying 204 the first braking force Y to the first piston P11, P21 of the disc brake caliper P1, P2 of the vehicle 1, applying 205 the second braking force Z to the second piston P12, P22 of the caliper P1, P2.

Figure 5:
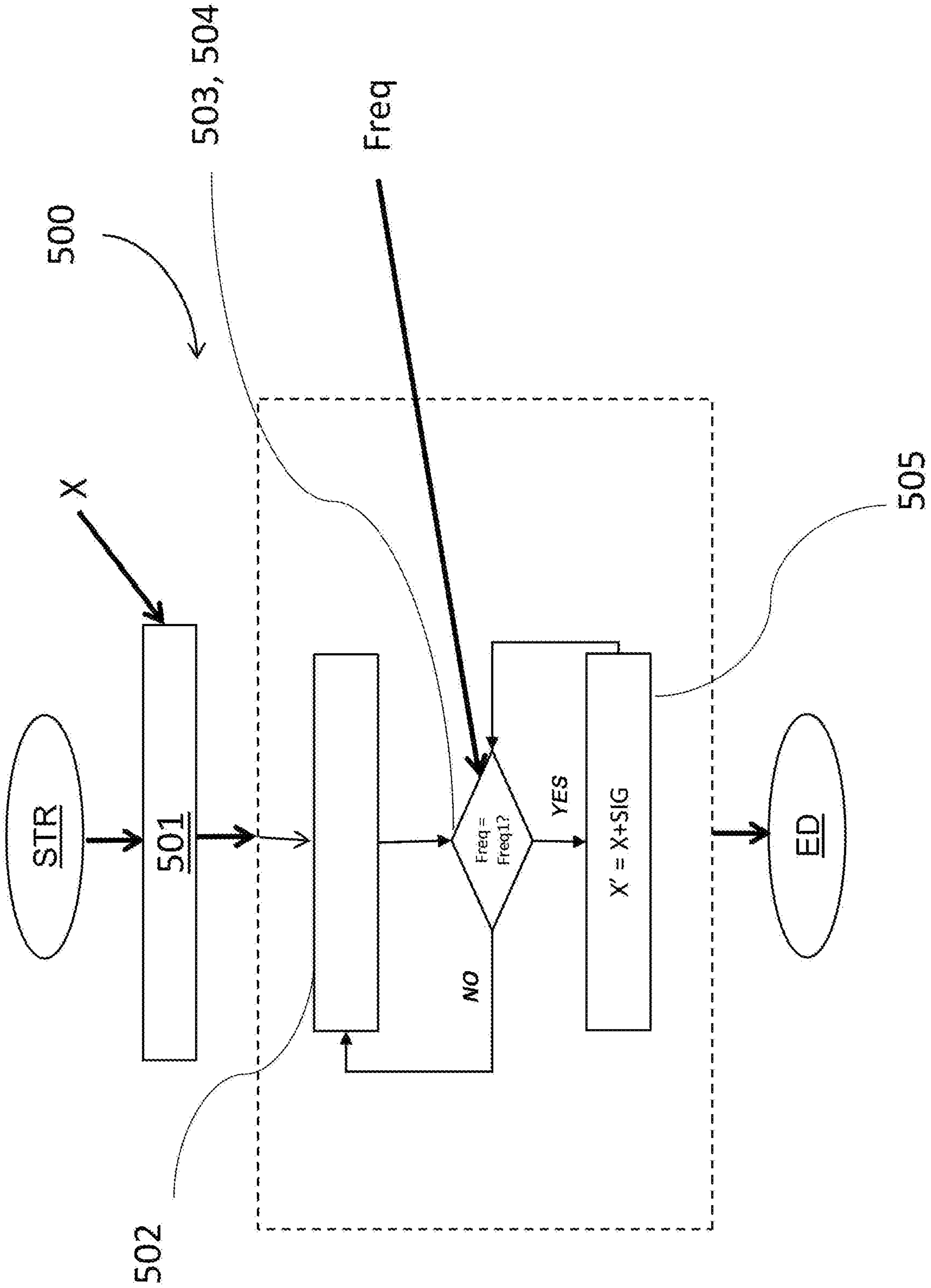
FIG. 5 shows in a flowchart, a first embodiment of the method for controlling the distribution of braking forces in the braking system in FIG. 1 according to the present invention.
Figure 6:
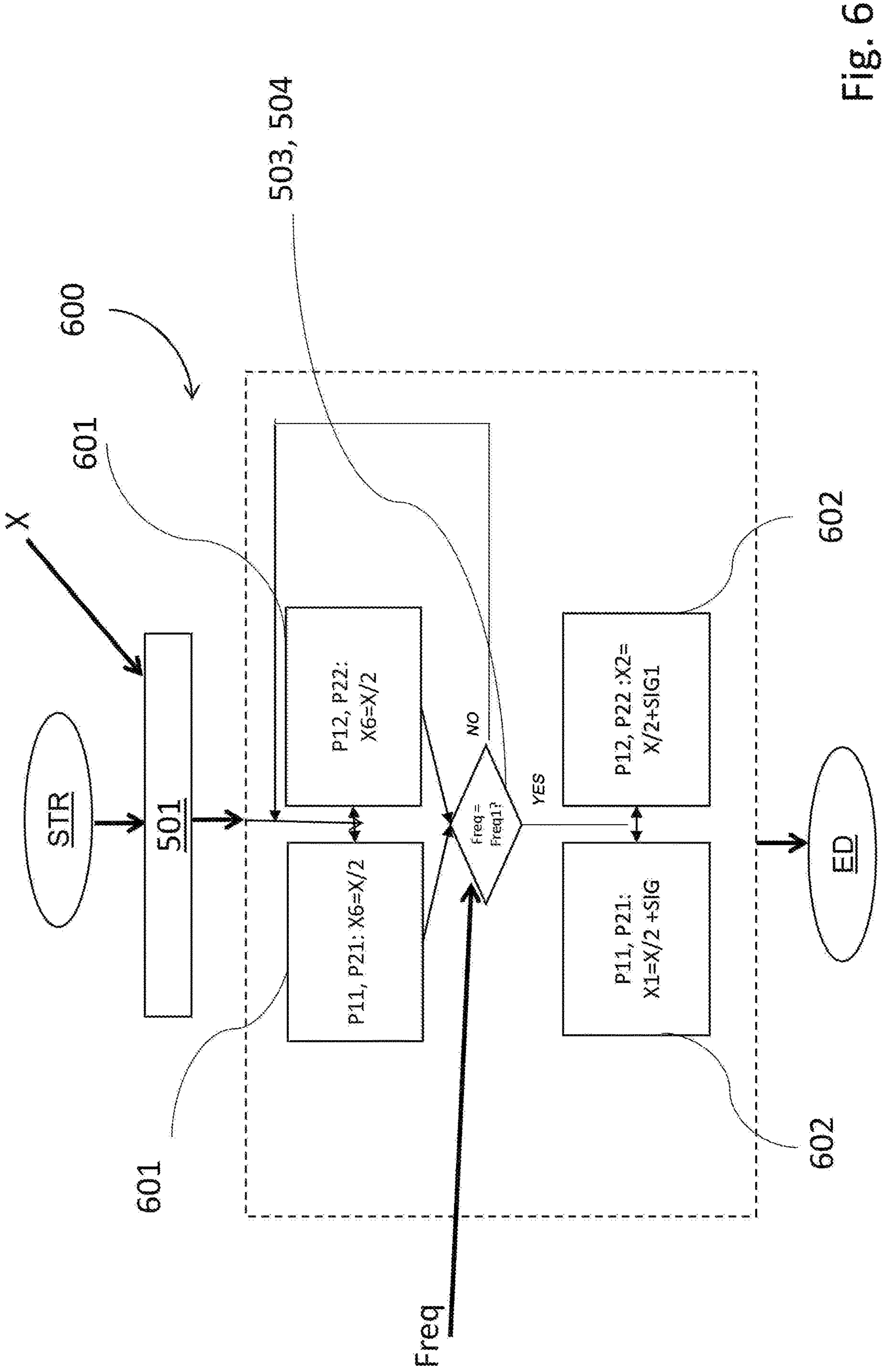
FIG. 6 shows, in a flowchart, a second embodiment of the method for controlling the distribution of braking forces in the braking system in FIG. 1 according to the present invention.

With reference to FIGS. 5-6, the following describes in greater detail the operational steps of a method 500, 600 for controlling the distribution of braking forces F1, F2, F3, F4, F5, F6 in a braking system 1000 of a vehicle 1 of the present invention, on at least one piston P31, P41, P11, P12, P21, P22 of a disc brake caliper P3, P4, P1, P2 of vehicle 1.

This control method is implemented through the control system 100 described above.

The control method 500, 600 of the invention comprises a second algorithm which implements an active control of the braking system 1000 of vehicle 1. This second algorithm is configured to activate only upon the detection, e.g., by means of a microphone or accelerometer, of a current Freq operating frequency information of the braking system, which is equal to a preset reference or critical frequency Freq1.

It is worth noting that this control method 500 of the invention is applicable to the distribution of braking forces on the single-piston calipers, i.e., on the first piston P31, P41 of the third P3 and fourth P4 calipers of the rear axle R1 of vehicle 1. In a different embodiment, this method 600 is further applicable to calipers with two or more pistons, e.g., on the first P11, P21, and second pistons P12, P22 of the disc brake calipers P1, P2 of the front axle A1 of the vehicle 1.

In a general embodiment, each of the aforesaid first BCU1, second BCU2, and third BCU3 brake control units of the system 100 are arranged to execute the codes of an application program implementing the method 500, 600 of the present invention. In other words, hereafter we will assume that the control method 500, 600 is implemented by any brake control unit of the system 100.

In a particular embodiment, the processor of the control braking units is configured to load, in a respective memory block, and execute the codes of the application program implementing the method 500, 600 of the present invention.

The control method 500, 600 in FIGS. 5-6 starts with a symbolic step of starting "STR" and ends with a symbolic step of ending "ED".

This control method 500 comprises the step of receiving 501 by the control system 100 a request for applying a braking force X following a braking action applied on a pedal 5 (or EPB-B button), of the braking system 1000.

Furthermore, in the case of a single-piston caliper P3 or P4, the method 500 involves applying 502 the required braking force X on the aforesaid piston P31, P41.

The method 500 further comprises a step of detecting 503', by the control system 100, further current characteristic frequency information Freq' of the braking system 1000 by means of the at least one sensor operatively associated with the braking system. This characteristic frequency Freq is representative of current noise and/or vibration associated with the braking system 1000.

In an embodiment, the at least one sensor operatively associated with the braking system 1000 comprises:

at least one microphone operatively associated with the braking system, a plurality of accelerometers, each associated with a disc brake caliper P1, P2 of the vehicle 1.

In an embodiment, the aforesaid microphone associated with the braking system can be, in the most general case, a microphone already installed in the car (either inside or outside the passenger compartment), e.g., such as an internal hands-free microphone.

Furthermore, the step of comparing 504, by the control system 100, this detected current characteristic frequency Freq information with a reference characteristic frequency Freq1 representative of a critical operating condition of the braking system 1000.

If this current characteristic frequency information Freq of the detected braking system 1000 is equal to the reference characteristic frequency Freq1, the method 500 comprises the step of applying 505 to the at least one piston P31, P41 of the caliper P3, P4 of disc brake of vehicle 1 a further braking force X' generated by superimposing a force signal SIG having a time-variable amplitude a on the required braking force X.

In this case, for example, the time-variable amplitude a of the force signal SIG is 20% lower than a mean value.

Furthermore, the variable portion of the force is provided to be such as not to bias in a perceptible manner the total deceleration of vehicle 1 and is compensated between the two axles A1, R1 of the system 1000 in counterphase to keep the total braking torque, and thus the deceleration, constant.

Furthermore, the frequency of the superimposable actuation force signal SIG is at least in the range of 1-200 Hz.

With reference to FIG. 6, in the embodiment of the method 600 for controlling the distribution of braking forces F3, F4, F5, F6 on a first P11, P21 and a second piston P12, P22 of a disc brake caliper P1, P2 of the vehicle 1, the aforesaid step of applying 502 described with reference to FIG. 5 comprises the step of applying 601 a sixth braking force X6=X/2 equal to one-half of the requested braking force X to both the first P11, P21 and the second pistons P12, P22 of the disc brake caliper P1, P2.

Furthermore, the method 600 provides that the aforesaid step of applying 505 described with reference to FIG. 5 comprises the step of applying 602 to the first P11, P21, and the second pistons P12, P22 of the disc brake caliper P1, P2 of the vehicle a seventh braking force X1 and a further seventh braking force X2, respectively, generated by superimposing said force signal SIG, SIG1 having time-variable amplitude a on said sixth braking force X6. In particular, the sum of the seventh braking force X1 and the further seventh braking force X2 is equal to the requested braking force X.

In an embodiment, the aforesaid force signal SIG, SIG1 having time variable amplitude a comprises a first force signal SIG and a second force signal SIG1 in mutual phase opposition. The first force signal SIG is superimposable the sixth braking force X6 applied to the first piston P11, P21 to generate the seventh braking force X1.

The second force signal SIG1 is superimposable the sixth braking force X6 applied to the second piston P12, P22 to generate said further seventh braking force X2.

In an embodiment, the aforesaid force signal SIG, SIG1 having time variable amplitude "a" comprises a signal which assumes amplitude values either greater or lesser than a mean value.

In a particular embodiment, the force signal SIG, SIG1 having time-varying amplitude a is chosen from the group consisting of sine signal, ramp signal, triangle signal, square wave signal, randomly varying signal around a mean value.

As demonstrated above, the method 500, 600 for controlling the distribution of braking forces in a braking system 1000 of a vehicle 1 has many advantages and achieves its intended purposes.

Indeed, the control method of the invention, makes it possible to reduce or eliminate noise and/or vibrations generated in a braking system of a vehicle, in particular a motor vehicle, while shortening the development time and cost of the system design.

In particular, it will no longer be necessary to reach the resolution of noise and vibration issues through lengthy mechanical design and subsequent testing.

Indeed, through the application of the second algorithm described above, it is possible, respectively, to activate the actuation modification when at least one of the current V, Temp, F, S, DPTemp parameters of the system falls within the critical conditions, or to activate the actuation modification control when one of the critical frequencies Freq1 of the braking system is detected by means of a microphone or accelerometer. This makes it possible to either reduce or eliminate, automatically, the noise and/or vibrations generated in the braking system of the vehicle.

To meet contingent and specific needs, the person skilled in the art may make several changes and adaptations to the above-described embodiments of the method and may replace elements with other functionally equivalent ones, without however departing from the scope of the following claims.

REFERENCES

1000 braking system
1 vehicle
100 control system of braking system
A1 front axle
FL first front wheel
FR second front wheel
R1 rear axle
RL first rear wheel
RR second rear wheel
2 first actuator module
3 second actuator module
ACT1 first actuator
ACT2 second actuator
P1 first brake caliper
ACT3 third actuator
ACT4 fourth actuator
P2 second brake caliper
ACT5 fifth actuator
P3 third brake caliper P3
ACT6 sixth actuator
P4 fourth brake caliper
BCU1 first brake control unit
BCU2 second brake control unit
BCU3 third brake control unit
5 pedal
S1, S2 braking signals
S3 further braking signal
CAN1 data communication line or bus
CAN2 further data communication line or bus
20 parking control unit
30 battery
31 system power management block
WS1 first speed sensor
WS2 second speed sensor
WS3 third speed sensor
WS4 fourth speed sensor
EP1 first parking actuator
EP2 second parking actuator
EP3 third parking actuator
EP4 fourth parking actuator
EPB-B parking button
F1, F2, F3, F4, F5, F6 braking forces
P11, P21, P13, P14 first piston
P12, P22, second piston
V, Temp, F, S, DPTemp first plurality of parameters
Vc, Tempc, Fc, Sc, DPTempc second plurality of parameters
X required braking force
Y first braking force
Z second braking force
X/2 third braking force
Freq current characteristic frequency information
Freq1 reference characteristic frequency
Y1 fourth braking force
Z1 fifth braking force
SIG first force signal
SIG1 second force signal
Freq' further current characteristic frequency information
X' further braking force
X6 sixth braking force
X1 seventh braking force
X2 further seventh braking force
200, 300, 400, 500, 600 braking force distribution control method
201, 501 step of receiving a braking force application request
202 step of receiving a first plurality of parameters
203, 302, 302', 504 step of comparing

204, 205, 206, 303, 304, 502, 505, 601, 602 steps of applying

301, 301', 503 step of detecting current characteristic frequency information

401 step of randomly selecting

402, 403 first and second braking force distribution method

The invention claimed is:

1. A method for controlling a braking system of a vehicle for distributing braking forces on at least one piston of a caliper of a disc brake of the vehicle, said method being performed by a control system of a braking system for distributing braking forces, the method comprising the steps of:

receiving, by the control system, a request for applying a braking force following a braking action applied to a pedal/button of the braking system;

applying to said at least one piston said requested braking force;

detecting, by the control system, a current characteristic frequency information of the braking system by at least one sensor operatively associated with the system, said characteristic frequency being representative of current noises and/or vibrations associated with the braking system;

comparing, by the control system, said current characteristic frequency information detected with a reference characteristic frequency representative of a critical operating condition of the braking system;

if said detected current characteristic frequency information of the braking system is equal to the reference characteristic frequency, the method further comprises the step of:

applying to the at least one piston of a caliper of a disc brake of the vehicle an additional braking force generated by superimposing a force signal having a time-variable amplitude on said requested braking force.

2. A method for controlling a braking system of a vehicle according to claim 1, for distributing braking forces on a first and a second piston of a caliper of a disc brake of the vehicle, wherein said applying step comprises the step of applying to both the first and second pistons of the caliper of a disc brake of the vehicle a first braking force equal to one-half of the requested braking force;

and wherein said applying step comprises the step of applying to the first and second pistons of the caliper of a disc brake of the vehicle a second and a further second braking force, respectively, generated by superimposing said force signal having time-variable amplitude on said first braking force, wherein the sum of said second and further second braking forces is equal to the requested braking force.

3. A method for controlling a braking system of a vehicle according to claim 1, wherein said at least one sensor operatively associated with the braking system comprises:

at least one microphone operatively associated with the braking system, or a plurality of accelerometers, each associated with a caliper of a disc brake of the vehicle.

4. A method for controlling a braking system of a vehicle according to claim 1, wherein said force signal having time-variable amplitude comprises a signal which takes values of amplitude which are higher or lower than a mean value.

5. A method for controlling a braking system of a vehicle according to claim 4, wherein said force signal having time-variable amplitude comprises a first and a second force signal in mutual phase opposition, said first force signal being superimposable on said first braking force applied to the first piston to generate said second braking force, said second force signal being superimposable on said first braking force applied to the second piston to generate said further second braking force.

6. A method for controlling a braking system of a vehicle according to claim 1, wherein said force signal having time-variable amplitude is chosen from the group consisting of: sinusoidal signal, ramp signal, triangle signal, square wave signal, signal randomly varying about a mean value.

7. A method for controlling a braking system of a vehicle according to claim 1, wherein said reference characteristic frequency representative of a critical operating condition of the braking system comprises a critical frequency band having a predetermined amplitude, said critical frequency band comprising both a reference characteristic frequency value and frequency values in a neighborhood of the reference characteristic frequency value.

8. A method for controlling a braking system of a vehicle according to claim 7, wherein said critical frequency band comprises frequencies which, in absolute value, differ by more than 5%, in particular by more than 3%, from the reference characteristic frequency.

9. A system for controlling a braking system of a vehicle for distributing braking forces on at least one piston of a caliper of a disc brake of the vehicle, the system comprising at least one electronic braking control unit configured to generate electrical signals for operating said brake calipers of the system, said at least one electronic braking control unit of the system being configured to perform the steps of the method according to claim 1.

* * * * *